A. L. SMITH.
PORTABLE IDLER FOR LINTER GINS.
APPLICATION FILED OCT. 26, 1915.
1,177,147.
Patented Mar. 28, 1916.
2 SHEETS—SHEET 2.
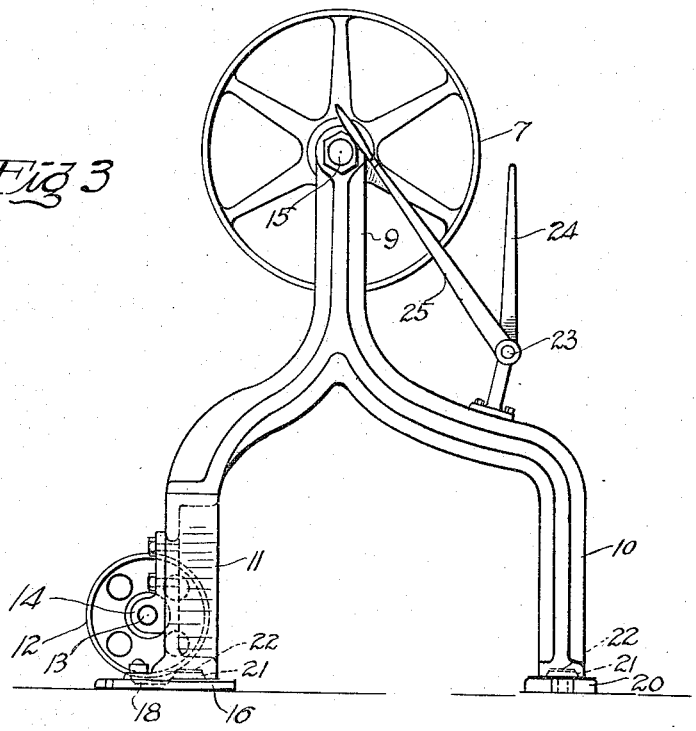
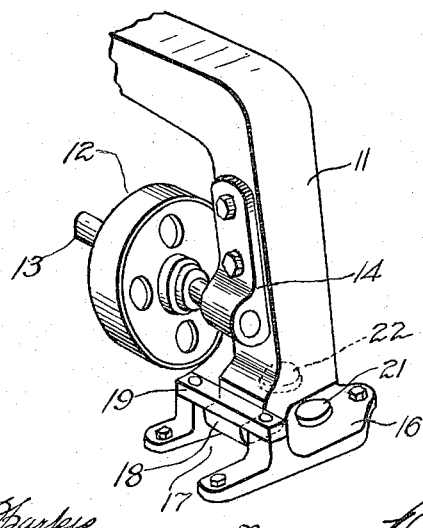
Inventor
A. L. Smith

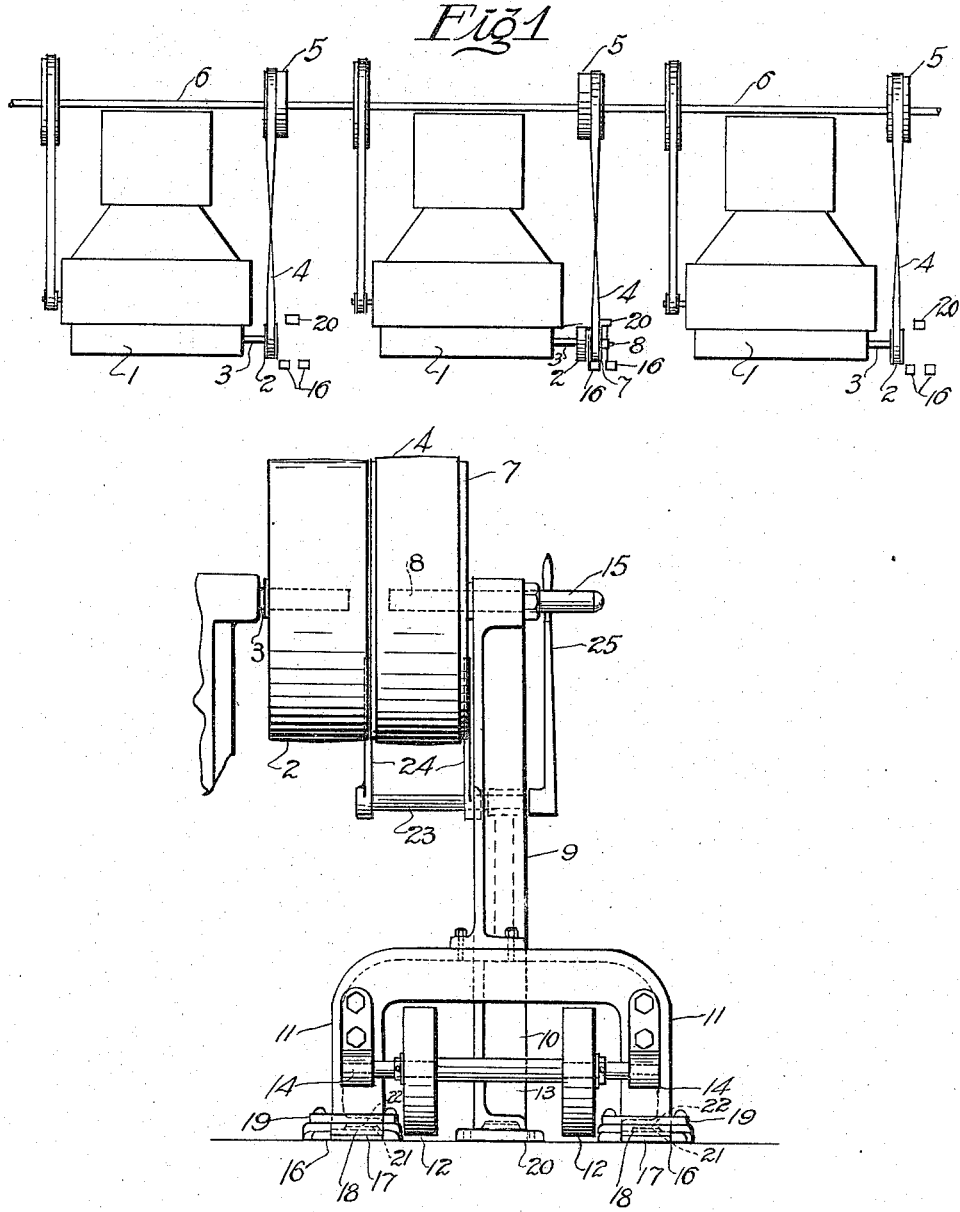

UNITED STATES PATENT OFFICE.

ALGERNON L. SMITH, OF BIRMINGHAM, ALABAMA, ASSIGNOR TO CONTINENTAL GIN COMPANY, OF BIRMINGHAM, ALABAMA, A CORPORATION OF DELAWARE.

PORTABLE IDLER FOR LINTER-GINS.

1,177,147.     Specification of Letters Patent.     Patented Mar. 28, 1916.

Application filed October 26, 1915. Serial No. 58,061.

*To all whom it may concern:*

Be it known that I, ALGERNON L. SMITH, a citizen of the United States of America, residing at Birmingham, in the county of Jefferson and State of Alabama, have invented certain new and useful Improvements in Portable Idlers for Linter-Gins, of which the following is a specification.

My invention relates to a novel apparatus which may be termed a portable idler and which is adapted to be placed alongside the pulley of any one of a group or battery of belt driven machines and to have the driving belt of such machine shifted thereto so that the machine can be stopped without stopping its driving belt.

Heretofore, in order that the units of a battery of belt driven machines could be independently stopped without stopping their common line shaft or source of power, it has been considered necessary either to provide clutch driving pulleys for each machine, or to equip each machine with special means for slacking its driving belt, so that it could be stopped, or with an idler to receive the continuously driven belt. But under many conditions it is not desirable or practicable to provide each machine with an idler or special means to stop it, and this is particularly true in the case of linter gins where the high speed drive of the saw cylinder shaft makes it a desideratum of much importance to reduce its bearings to two in number as thereby the difficult problem of exact alinement required for a greater number of bearings is eliminated and the bearing friction reduced to a minimum. The provision of an idler for each machine would necessitate an outboard shaft bearing, thereby increasing the bearings to three in number, which is objectionable for the reasons above stated. Moreover, the linter gin saw cylinders become rapidly dulled and require frequent changes and as the practice is to key the saw pulley on the saw shaft it is desirable to provide a means for quickly shifting the belt from the saw pulley without interfering with the latter's removal with the saw cylinder.

I have conceived that a very substantial improvement in the operation of linter gins will result from the provision of a portable idler capable of being transported readily and to be quickly and accurately adjusted into position alongside the driving pulley of any gin which it may be desired to stop for any purpose without interrupting the other gins. I have also provided a novel means fixed alongside each gin and adapted to spot and anchor the portable pulley frame to facilitate its ready adjustment into operating position.

Though I have more especially referred to the utilization of my invention in connection with linter gins, its application will be obvious where conditions similar to those above pointed out are found in practice.

I also claim as part of my invention other novel features of construction and arrangements of parts which are hereinafter more particularly described and set forth in the appended claims and which in their preferred embodiment only are illustrated in the accompanying drawings, wherein:—

Figure 1 is a plan view of a battery of linter gins showing the arrangement of the spotting plates and the portable idler in operating position beside one of the gins. Fig. 2 is a front elevation of the apparatus showing the belt shifted to the idler pulley. Fig. 3 is a side elevation of Fig. 2; and Fig. 4 is a detail perspective view showing the anchor plate and the forward foot of the frame before engagement with the plate.

Similar reference numerals refer to similar parts throughout the drawings.

I have illustrated my invention in connection with a series of linter gins 1, each of which has a driving pulley 2 for its respective saw cylinder made fast on the outer end of the shaft 3 which is mounted in suitable bearings in the gin frame so as to support the pulley in overhung position at the end of the gin. The several gins are driven by belts 4 which pass over extra width pulleys 5 fast on a line shaft 6. It will be evident that the gins, having no idler pulleys, can not be stopped without either stopping the line shaft, or providing clutch pulleys on such shaft, or having to throw off a fast running driving belt. To avoid such alternatives I provide an idler pulley 7 of the same diameter as the gin saw pulleys 2 and mount it preferably on an overhung bearing shaft 8 in the standard 9 of a portable frame which is provided with a tripod base, adapted to straddle the screw conveyer (not shown) for the cotton seed, and comprising a rear leg 10 and a pair of spaced front legs 11. Rollers 12, for the convenient transportation of the frame, are journaled on a shaft 13 held fast in bearings 14 on the front legs 11. The shaft 8 is preferably fast in and extends through the standard 9 so that its exposed end will serve as a handle 15 for pushing or pulling the frame about on its rollers. The gins are spaced far enough apart to permit the introduction of the portable idler frame between them so as to bring its pulley into position alongside and concentric with the gin saw pulley 2.

In order that the idler pulley can be moved quickly into position beside any gin and its supporting frame firmly anchored to the floor so as to take the strain of the belt, when transferred thereto, I attach by bolts, screws or otherwise to the flooring adjacent to the saw pulley 2 of each gin spotting and anchoring plates, of which there are preferably three, and which are spaced to receive the supporting legs of the frame when the latter is in position with its idler juxtaposed to and concentric with the gin saw pulley. Having spotted the frame I anchor it by providing the forward spotting plates 16 for the front legs 11 with a recess or seat 17 wide enough to snugly receive a depending and forwardly projecting lug 18 on the foot of each front leg. A cross bar 19 is made fast above the recess 17 and adapted to receive the lug 18 under it. The bar may be integral with the plate or otherwise secured thereto and is so disposed that when the frame is moved into correct position on its rollers and swung about the roller shaft as an axis, the lugs 18 will swing down into the recesses 17 and interlock under the cross bars 19 so that the forward legs of the frame are securely held against lateral or vertical displacement when carrying the belt. To more accurately center the frame on the spotting plates 16 and 20 and to prevent the legs from shifting on the plates when once seated thereon, I provide a tapering boss 21 on each of the plates 16 and 20 which are adapted to enter correspondingly shaped tapering sockets 22 on the under faces of the frame legs. The rear spotting plate is set on a level with the forward spotting plates so that the frame is held anchored in level position.

It is important to note that the anchor plates 16 are spaced so as to leave but a fraction of an inch clearance for the rollers of the frame to pass between them. By this means the operator is assured, when the rollers are moved between the front plates and the rear leg of the frame is in line to seat upon the rear plate 20, that, as the frame is lowered, the idler pulley will not contact with the rotating pulley 2 but will pass it with a close clearance. With the pulley and idler standing concentric and but slightly spaced apart, it is an easy matter to shift the belt over to the idler and the width of the driving pulley 5 on the line shaft will permit the belt to shift over in line with the idler pulley. In order to hold the belt on the idler while the gin saw cylinder is being moved or changed, I journal in the rear end of the frame a horizontal shaft 23 having fixed thereon a pair of spaced guide fingers 24 disposed to straddle the belt when on the idler pulley and to hold it against slipping therefrom to either side. A handle 25 is attached to the outer end of the shaft and preferably disposed so as to strike the handle 15 when the fingers are in position to straddle the belt. The handle 15 thus forms a stop for the finger operating handle 25 against which the handle for the fingers can lean and hold them in operating position.

It will be understood that other means for anchoring the portable idler frame may be employed, but those described are preferable, particularly since they assist in the ready placing and centering of the frame in operating position.

What I claim as new and desire to secure by Letters Patent, is:—

1. In a device of the character described, a frame, rollers mounted on said frame, fixed floor plates to spot and anchor said frame, and an overhung idler pulley journaled at one side of the frame.

2. In a device of the character described, the combination with the driving pulley of a machine and its overhung supporting shaft of a rotatable frame having an idler pulley rotatable thereon, said pulleys being of substantially equal diameter, and means to anchor the frame in position with the idler pulley concentric with and juxtaposed to said driving pulley, substantially as described.

3. In combination, a main power shaft, a plurality of belt driven machines, each having an overhung driving pulley, belts leading from said pulleys to the line shaft, extra width driving pulleys for said belts on said line shaft, and a portable frame having rotatably mounted thereon an idler adapted to receive the belt from and return it to any of said machine driving pulleys when adjusted alongside the later, substantially as described.

4. The combination with a plurality of overhung driving pulleys for the saws of linter gins, of belts running therefrom, extra width driving pulleys on the line shaft, and belts from said latter pulleys to said gin saw pulleys, anchoring means fixed to the flooring adjacent to each gin saw pulley, and a portable frame having mounted thereon an idler pulley and adapted to engage said anchor means and present said idler concentric with and adjacent to the saw pulley of any one of said gins, said idler pulley being adapted to receive the running belt from and to return it to a saw pulley, and said line shaft pulleys being each wide enough to carry its belt in the two operating positions of the latter, substantially as described.

5. In a device of the character described, a portable frame, an overhung bearing in the upper portion thereof, an idler rotatable on said bearing, a handle at the upper end of the frame, and rollers at the lower end of the frame upon which it is adapted to be moved, substantially as described.

6. The combination with a portable frame having an idler pulley journaled thereon and adapted to be juxtaposed to a driving pulley, of anchor plates adapted to be made fast to the floor and having cross members over recesses therein, and lugs at the base of the frame adapted to be engaged in said recesses and interlocked under said cross members, substantially as described.

7. In combination with a portable frame having an idler pulley journaled in its upper end and adapted to be juxtaposed to a driving pulley and spaced rollers journaled in its lower end, of fixed spotting plates spaced to receive snugly between them said rollers, said plates having a socket with an overhead cross member, said frame having feet with lugs adapted to fit into the sockets and engage under said cross members in which position the feet rest upon the body of the plates, and a rear plate to spot and support the rear end of the frame, substantially as described.

8. In a device of the character described, a portable frame, an overhung idler journaled in the upper part of the frame, belt guiding means on the frame and movable in position to hold a belt on said idler, substantially as described.

In testimony whereof I affix my signature.

ALGERNON L. SMITH.

Witness:
NOMIE WELSH.

Copies of this patent may be obtained for five cents each, by addressing the "Commissioner of Patents, Washington, D. C."